(12) United States Patent
Yonezawa

(10) Patent No.: US 6,755,409 B2
(45) Date of Patent: Jun. 29, 2004

(54) AUTOMATIC POSITIONING DEVICE

(75) Inventor: Keitaro Yonezawa, Kobe (JP)

(73) Assignee: Kabushiki Kaisha Kosmek, Hyogo (JP)

(*) Notice: Subject to any disclaimer, the term of this patent is extended or adjusted under 35 U.S.C. 154(b) by 0 days.

(21) Appl. No.: 10/355,573

(22) Filed: Jan. 31, 2003

(65) Prior Publication Data
US 2003/0160374 A1 Aug. 28, 2003

(30) Foreign Application Priority Data
Feb. 22, 2002 (JP) ........................................ 2002-045519

(51) Int. Cl.[7] .............................................. B23Q 3/02
(52) U.S. Cl. ..................................................... 269/309
(58) Field of Search ............................. 269/20, 24, 27, 269/32, 25, 48.1, 93–94, 50, 52, 91, 157, 309, 310

(56) References Cited

U.S. PATENT DOCUMENTS 6,095,509 A    8/2000   Yonezawa

FOREIGN PATENT DOCUMENTS

EP    1 078 713 A1    2/2001
JP       57-27640 A    2/1982

Primary Examiner—Robert C. Watson
(74) Attorney, Agent, or Firm—Akin Gump Strauss Hauer & Feld, L.L.P.

(57) ABSTRACT

A work pallet (3) is opened to provide a circular positioning hole (5). A plug member (12) is inserted into the positioning hole (5) and projects from a base plate (2). The plug member (12) is provided with a slant outer surface (13) which narrows upwards. An intermediate member (15) in the shape of a thin-walled cylinder is arranged outside the plug member (12). The intermediate member (15) is provided with a straight outer surface (16) which is fitted into the positioning hole (5) and with a slant inner surface (17) which opposes to the slant outer surface (13) of the plug member (12). A coned disk spring (34) moves down the intermediate member (15) for locking through a pull member (21).

16 Claims, 5 Drawing Sheets

F I G. 2
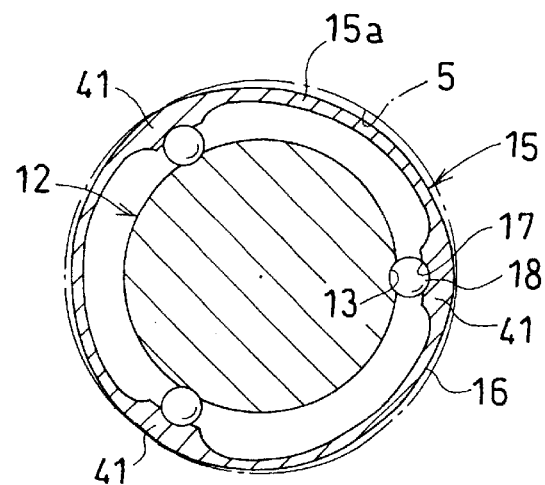
F I G. 3A
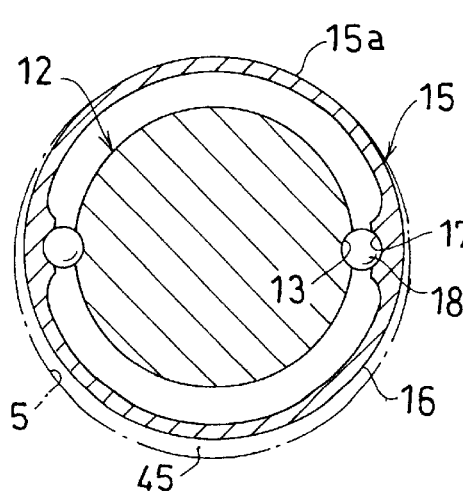
F I G. 3B
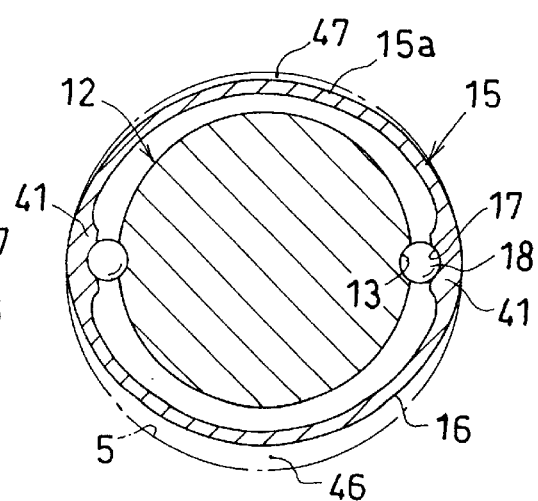

AUTOMATIC POSITIONING DEVICE

BACKGROUND OF THE INVENTION

1. Field of the Invention

The present invention relates to a device which automatically positions a movable member such as a work pallet to a reference member such as a table of a machine tool.

2. Explanation of Related Art

The automatic positioning device of this kind generally fits a circular positioning hole provided by opening a supported surface of a movable member onto a plug which projects from a supporting surface of a reference member (for example, see Japanese Patent Public Disclosure No. 57-27640).

The conventional technique has to provide a predetermined fitting gap between the positioning hole and the plug so as to smoothly fit the former to the latter. Therefore, the fitting gap reduces the positioning accuracy.

SUMMARY OF THE INVENTION

The present invention has an object to provide a device which can automatically perform a positioning operation with a high accuracy.

In order to accomplish the above object, the present invention has constructed an automatic positioning device in the following manner, for example, as shown in FIGS. 1A and 1B, in FIGS. 4A and 4B or in FIG. 5.

The automatic positioning device comprises a reference member 2 having a supporting surface 2a which receives a supported surface 3a of a movable member 3. The movable member 3 has the supported surface 3a opened to provide a positioning hole 5 which is formed substantially circular. A plug member 12 to be inserted into the positioning hole 5 projects from the reference member 2 in a direction to a leading end and is fixed to the reference member 2. The plug member 12 is provided with a slant outer surface 13 which approaches an axis as it goes in the direction to the leading end. The plug member 12 has an outer periphery above which an annular intermediate member 15 is arranged so that at least peripheral one part of the intermediate member 15 radially expands and contracts. The intermediate member 15 is provided with a straight outer surface 16 which is fitted into the positioning hole 5 and with a slant inner surface 17 which opposes to the slant outer surface 13 of the plug member 12. A pull member 21 is axially movably inserted into the plug member 12 and has a leading end portion connected to the intermediate member 15. A locking means 31 and a releasing means 32 are provided within the reference member 2. The locking means 31 moves the intermediate member 15 for locking in a direction to a base end through the pull member 21. On the other hand, the releasing means 32 moves the intermediate member 15 for releasing in the direction to the leading end through the pull member 21.

The present invention offers the following function and advantages.

When positioning the movable member to the reference member, first, the positioning hole of the movable member is fitted onto the plug member of the reference member and thereafter the locking means drives the intermediate member in the direction to the base end through the pull member. Then the slant inner surface of the intermediate member makes a wedging engagement with the slant outer surface of the plug member directly or indirectly, thereby expanding at least one part of the intermediate member radially outwards. This tightly attaches the straight outer surface of the intermediate member to the positioning hole. Simultaneously, the pull member pushes the movable member to the reference member through the tightly attached intermediate member.

On the other hand, when releasing the locked movable member, it is sufficient if the releasing means drives the intermediate member in the direction to the leading end through the pull member. Then the wedging engagement between the slant outer surface and the slant inner surface is cancelled to result in contracting at least one part of the intermediate member radially inwards. This can cancel the tightly attached condition between the straight outer surface of the intermediate member and the positioning hole. Thereafter, it is sufficient if the movable member is separated from the reference member.

The present invention can remove the fitting clearance after the positioning hole and the intermediate member have been fitted to each other. In consequence, it can smoothly fit these positioning hole and intermediate member to each other and at the same time perform the positioning operation with a high accuracy. Besides, since the locking means and the releasing means are provided within the reference member, it is possible to automatically perform the positioning operation and cancel the positioning operation and in addition to prevent chips, dust and the like foreign matters from invading interior areas of the locking means and the releasing means.

Further, at the time of the lock driving, the pull member pushes the movable member to the reference member through the intermediate member. Therefore, depending on the needs, an exclusive clamping means may be omitted.

The present invention includes the following device.

For example, as shown in FIGS. 1A and 1B, the intermediate member 15 comprises a thin-walled cylinder and has an annular wall 15a. The annular wall 15a has at least one part constructed so that it can elastically deform radially outwards and return radially inwards by its own elastic restoring force. The intermediate member 15 has an inner periphery provided with the slant inner surface 17 in plural number, which are spaced apart from each other peripherally at a predetermined interval. This invention can make the outer surface of the intermediate member without forming any clearance. Therefore, it can prevent chips, dust and the like foreign matters from invading a space inside the intermediate member. This makes it possible to use the positioning device for a long period of time with maintenance free.

Further, the present invention includes the following device.

For example, as shown in FIGS. 1A and 1B, the slant outer surface 13 is provided in plural number on the outer periphery of the plug member 12 as spaced apart from each other peripherally at a predetermined interval and a rolling member 18 is inserted into a space defined between every slant outer surface 13 and every slant inner surface 17. This invention can engage the slant outer surface with the slant inner surface and disengage the former from the latter smoothly through the rolling member.

Moreover, the present invention includes the following device.

For example, as shown in FIGS. 4A and 4B, at least one slit 51 which extends axially is provided in the annular wall 15a of the intermediate member 15, so that the annular wall 15a can elastically deform radically outwards and return radially inwards by its own elastic restoring force. This invention facilitates to process the intermediate member simply and precisely and besides can increase a radial elastic deformation amount of the intermediate member greatly.

The present invention, for example, as shown in FIGS. 4A and 4B, may attach rubber or the like resilient sealing member 52 to the slit 51. In this case, the resilient sealing member can prevent foreign matters from invading the space inside the intermediate member.

The present invention, for example, as shown in FIG. 1B or FIG. 4B, includes a device wherein the intermediate member 15 is formed over its substantially entire periphery with the straight outer surface 16. This invention can increase an area of the tight attachment between the intermediate member and the positioning hole, which results in the possibility of performing the positioning operation with a higher accuracy.

The present invention, for example, as shown in FIG. 6, includes a device wherein the intermediate member 15 is provided with the straight outer surface 16 in plural number as spaced apart from each other peripherally. This invention can decrease a tight attachment area of the straight outer surface to result in the possibility of securing a large press force.

Additionally, the present invention includes the following device.

For instance, as shown in FIG. 6, the intermediate member 15 is attached to the plug member 12 so that the former is inhibited from rotating around the axis. The intermediate member 15 is provided with a pair of the straight outer surfaces 16, 16 which oppose to one another. Relief surfaces, 71, 71 are formed by concaving portions defined between the paired straight surfaces 16, 16. According to this invention, the paired relief surfaces can fit the intermediate member and the positioning hole to each other smoothly, which results in making the fitting operation easy and reliable.

Moreover, the present invention includes the following device.

For instance, as shown in FIG. 5, at least one of the plug member 12, the intermediate member 15 and the pull member 21 is opened to provide a discharge port 64, 65, 66 for discharging cleaning pressurized fluid. According to this invention, since the pressurized fluid can blow off the foreign matters attached to the positioning device, the positioning operation can be performed assuredly with a high accuracy.

Furthermore, the present invention, for example, as shown in FIG. 4A, includes a device wherein the slant inner surface 17 directly engages with the slant outer surface 13. This invention can provide a positioning device which is simple and compact.

BRIEF DESCRIPTION OF THE DRAWINGS

FIG. 1A, FIG. 1B and FIG. 2 show a first embodiment of the present invention;

FIG. 1A is a sectional view of an automatic positioning device when seen in elevation;

FIG. 1B is a sectional view of a plug means provided in the positioning device when seen in plan and is a view corresponding to a sectional view when seen along a line 1B—1B in FIG. 1A in a direction indicated by arrows;

FIG. 2 is a schematic view of an intermediate member provided in the positioning device in a radially expanded state and is a partial view similar to FIG. 1B;

FIGS. 3A and 3B show a modification of the intermediate member;

FIG. 3A shows the intermediate member radially contracted and is similar to FIG. 2;

FIG. 3B shows the intermediate member radially expanded and is similar to FIG. 2;

FIG. 4A is a sectional view of an automatic positioning device when seen in elevation;

FIG. 4B is a view corresponding to a sectional view when seen along a line 4B—4B in FIG. 4A in a direction indicated by arrows;

DESCRIPTION OF THE PREFERRED EMBODIMENTS

Figure 1B:
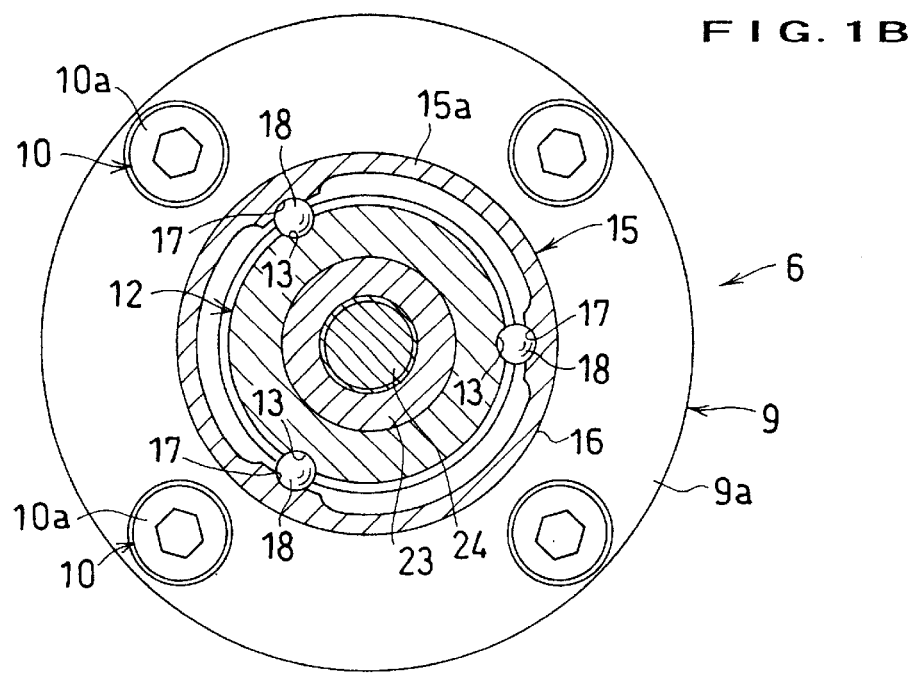
Figure 1A:
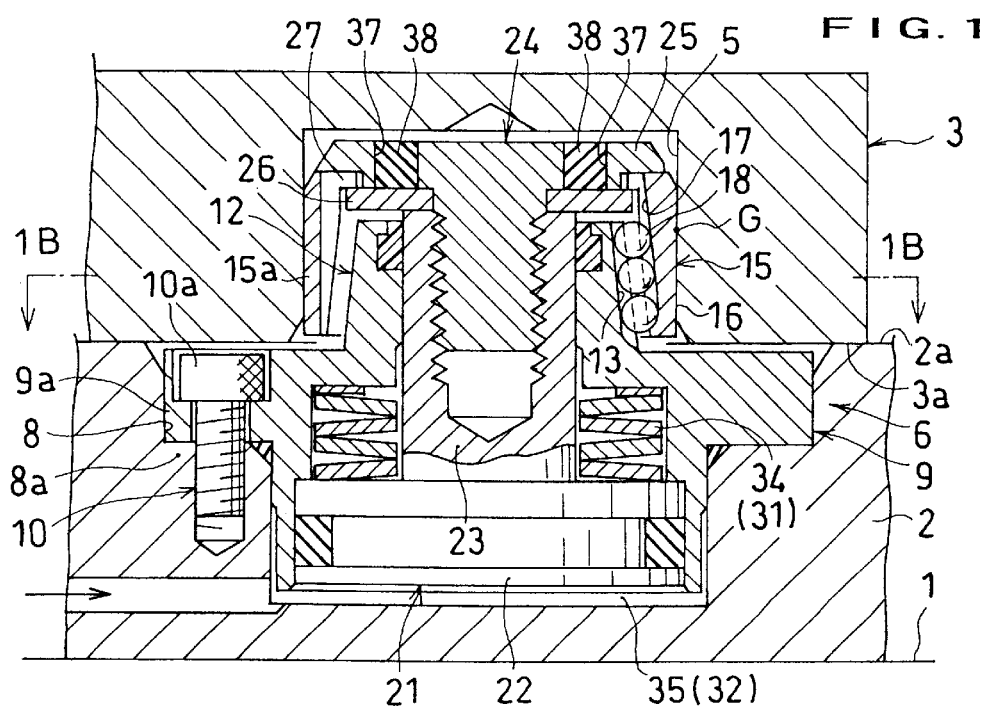

FIGS. 1A and 1B as well as FIG. 2 show a first embodiment of the present invention.

First, an explanation is given for a whole structure of an automatic positioning device of the present invention by resorting to FIGS. 1A and 1B.

In this embodiment, a base plate 2 of a reference member is placed on a table 1 of a machine tool. The base plate 2 has a supporting surface 2a which receives a supported surface 3a of a work pallet 3 of a movable member. The work pallet 3 is arranged so as to align with the base plate 2.

The work pallet 3 has the supported surface 3a opened to provide precisely processed circular positioning holes 5. The base plate 2 is provided with plug means 6 in correspondence with the respective positioning holes 5. Here only one set of the positioning hole 5 and the plug means 6 is illustrated although actually plural sets of the positioning hole 5 and the plug means 6 are provided.

The plug means 6 is constructed as follows.

The base plate 2 has the supported surface 2a formed with a stepped attaching bore 8 into which a datum block 9 is precisely fitted. The block 9 has a flange 9a fixed to a stepped portion 8a of the attaching bore 8 through four fastening bolts 10. A plug member 12 is inserted into the positioning hole 5 and projects from the block 9. The plug member 12 has an axis which is substantially the same as an axis of the attaching bore 8.

The plug member 12 has an outer periphery provided with three slant outer surfaces 13 which approach the axis as they go upwards (in a direction to a leading end) and are peripherally spaced apart from each other at substantially the same interval.

An annular intermediate member 15 is arranged above the outer periphery of the plug member 12. In this embodiment, the intermediate member 15 comprises a thin-walled cylinder and is constructed so that it can elastically deform radially outwards and return radially inwards by its own elastic restoring force.

The intermediate member 15 has an outer periphery provided over its entirety with a straight outer surface 16 which is fitted into the positioning hole 5. Incidentally, with the intermediate member 15 radially contracted, a fitting clearance (G) between the positioning hole 5 and the straight outer surface 16 is a small value of about 0.05 mm in the case where the positioning hole 5 has a diameter of, for example, about 30 mm.

And the intermediate member 15 has an inner periphery provided with three slant inner surfaces 17 which oppose to the slant outer surfaces 13 of the plug member 12 and are peripherally spaced apart from each other at substantially the same interval.

Three metal balls (rolling members) 18 are inserted into spaces defined between the respective slant outer surfaces 13 and the respective slant inner surfaces 17. A retaining ring (not shown) may be attached between the balls 18.

A pull member 21 is vertically movably inserted into the plug member 12. The pull member 21 comprises a piston 22 hermetically inserted into a lower portion of the block 9, a piston rod 23 projecting upwards from the piston 22, a pull bolt 24 attached to an upper portion of the piston rod 23 in screw-thread engagement, and a ring 26 which is pushed to an upper end surface of the piston rod 23 by a head portion 25 of the pull bolt 24. The intermediate member 15 has an upper flange 27 fitted into a space defined between the bolt head portion 25 and the ring 26.

A locking means 31 and a releasing means 32 are provided within the block 9. The locking means 31 is constructed by a plurality of coned disk springs 34 layered one on another on an upper side of the piston 22 and the piston 22. The releasing means 32 is composed of a releasing hydraulic chamber 35 formed below the piston 22 and the piston 22.

The pull bolt head portion 25 is formed with two small holes 37 for screwdriving. Silicon rubber or the like sealant 38 is filled into every hole 37. And silicon rubber or the like sealant (not shown) is also filled into the surroundings of a head portion 10a of the fastening bolt 10. This is in an attempt to prevent chips, dust or the like foreign matters from staying in recesses.

The automatic positioning device operates as follows.

Under a released condition in FIGS. 1A and 1B, pressurized oil is supplied to the hydraulic chamber 35. This enables the piston 22 to move up the piston rod 23 against an urging force of the coned disk springs 34. The piston rod 23 raises the intermediate member 15 through the pull bolt 24 and the ring 26 to change over the intermediate member 15 to a radially contracted state. In this case, a contact gap is formed between an upper end surface of the plug member 12 and an under surface of the ring 26.

When positioning the work pallet 3 to the base plate 2, first, as shown in FIG. 1A, under the released condition, the work pallet 3 is lowered, thereby fitting the positioning hole 5 to the straight outer surface 16 of the intermediate member 15.

Next, the pressurized oil in the hydraulic chamber 35 is discharged. Then the piston 22 strongly moves down the intermediate member 15 through the pull bolt 24 and the ring 26 by resorting to the urging force of the coned disk springs 34. Then the slant inner surfaces 17 of the intermediate member 15 make a wedging engagement with the slant outer surfaces 13 of the plug member 12 through the balls 18. Thus as shown by a schematic view of FIG. 2, three portions of an annular wall 15a of the intermediate member 15 elastically and radially expand through the balls 18 and these radially expanded portions 41, 41, 41 are tightly attached to the positioning hole 5.

Simultaneously, the pull bolt 24 pulls down the work pallet 3 through the intermediate member 15. Accordingly, the supported surface 3a of the work pallet 3 is pushed to the supporting surface 2a of the base plate 2. Thereafter, a clamping means (not shown) strongly pushes the work pallet 3 to the base plate 2.

When switching over the locked condition to the released condition, first, the clamping means (not shown) is cancelled from the clamped condition. Next, as mentioned above, it is sufficient if pressurized oil is supplied to the hydraulic chamber 35. This enables the pull bolt 24 and the ring 26 to raise the intermediate member 15. The intermediate member 15 radially contracts by its own elastic restoring force and therefore is cancelled from the locked condition. Thereafter, the work pallet 3 is raised.

At the time of the above lock driving, the ring 26 has its under surface brought into contact with the upper end surface of the plug member 12. This inhibits the intermediate member 15 from descending over a predetermined distance.

Further, in the event that a pull-down force of the intermediate member 15 at the time of the lock driving is set to a sufficiently large value, the clamping means (not shown) may be omitted.

FIGS. 3A and 3B show a modification of the intermediate member 15. This modification is different from the first embodiment in that the slant outer surface 13 of the plug member 12 and the slant inner surface 17 of the intermediate member 15 are provided in two sets so that they oppose to each other. FIG. 3A is a schematic view showing the intermediate member 15 radially contracted and is similar to FIG. 1B. FIG. 3B is a schematic view showing the intermediate member 15 radially expanded and is similar to FIG. 2. Reference numeral 45 in FIG. 3A indicates a gap formed attributable to a centering error between the positioning hole 5 and the intermediate member 15. Further, in FIG. 3B reference numerals 46, 47 designate a first relief space and a second relief space, respectively.

And when using the positioning device of the type shown in FIGS. 1B and 2 and the positioning device of the type shown in FIGS. 3A and 3B, it is possible to smoothly fit the work pallet 3 to the base plate 2 and at the same time to position the former to the latter precisely owing to an action of the first and the second relief spaces 46, 47.

The first embodiment and its modification can be modified as follows.

The slant outer surface 13 and the slant inner surface 17 may be provided in at least four sets or in one set instead of being provided in three or two sets.

In addition, a cylindrical roller or a spherical roller may be utilized instead of the ball 18. Besides, the ball 18 may be omitted and the slant outer surface 13 may be brought into direct contact with the slant inner surface 17.

The supporting surface 2a may be provided on an upper surface of the flange 9a of the datum block 9 instead of being provided on the base plate 2.

FIGS. 4A and 4B, FIG. 5, and FIG. 6 show a second embodiment, a third embodiment and a fourth embodiment, respectively. In these separate embodiments, members similar to the constituent members in the first embodiment are, in principle, designated by the same reference numerals or characters for explanation.

Figure 4B:
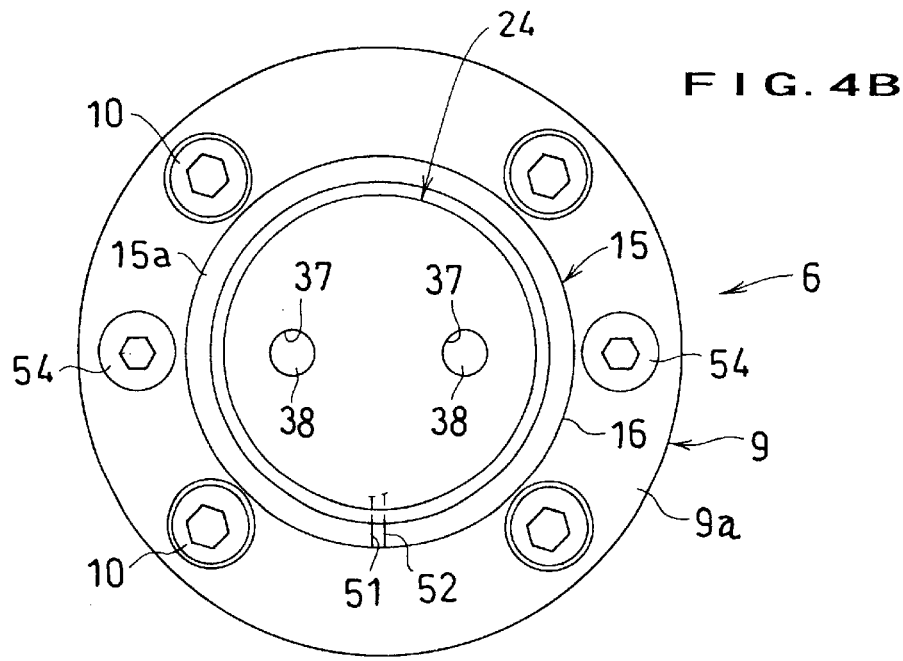
FIGS. 4A and 4B show a second embodiment of the present invention.
Figure 4A:
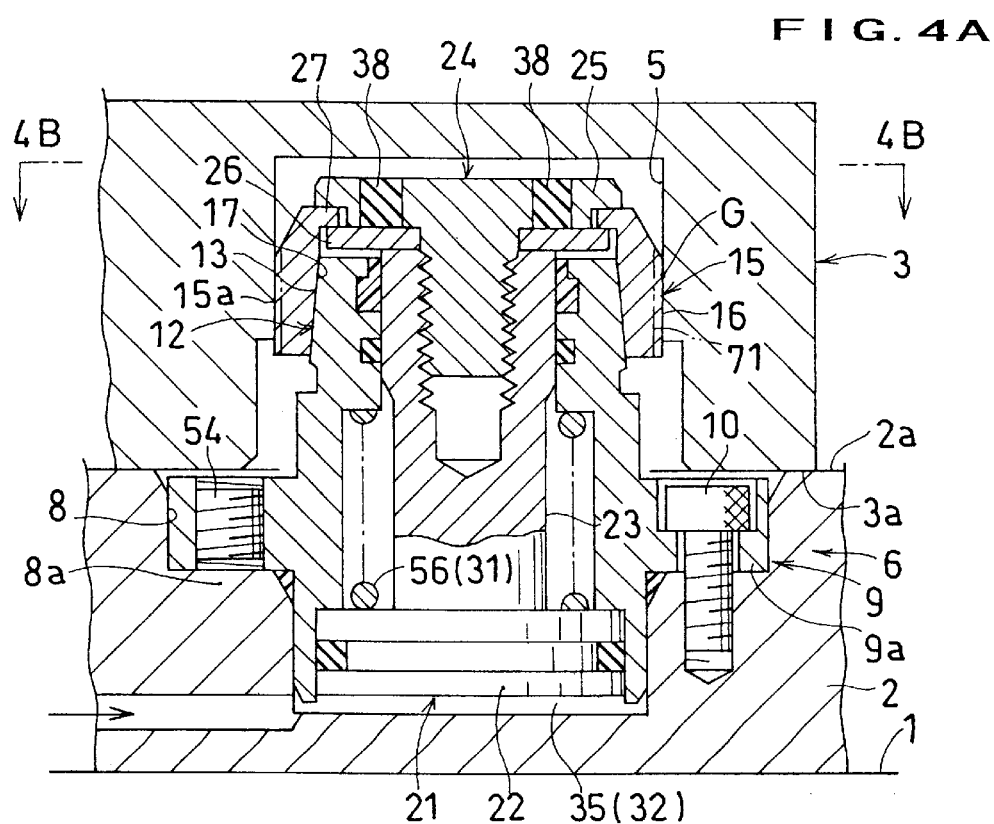

An invention of the second embodiment shown in FIGS. 4A and 4B is different from that of the first embodiment on the following points. FIG. 4A is a sectional view of an automatic positioning device when seen in elevation and is similar to FIG. 1A. FIG. 4B is a view corresponding to a sectional view when seen along a line 4B—4B in FIG. 4A in a direction indicated by arrows and is similar to FIG. 1B.

In this case, the intermediate member 15 is formed in the shape of a collet. More specifically, the intermediate member 15 has the annular wall 15a provided with a slit 51 which extends axially and is opened to vertical opposite ends of the annular wall 15a. Thus the annular wall 15a has a substantially whole peripheral portion constructed so that it can elastically deform radially outwards and return radially inwards by its own elastic restoring force. The intermediate member 15 has the outer periphery provided substantially over its entirety with the straight outer surface 16. The intermediate member 15 also has the slant inner surface 17 brought into direct contact with the tapered slant outer surface 13 of the plug member 12.

The slit 51 is sufficient if it axially extends. There are considered two cases. In one case, the slit 51 extends straightly along the axis and in the other case, it is inclined with respect to the axis. Besides, the slit 51 is not limited to one but it may be in plural number. In this case, it is considered to open the slit 51 peripherally and alternately to an upper surface and to a lower surface of the intermediate member 15.

Further, here, rubber or the like resilient sealing member 52 is attached to the slit 51 through adhesion or filling. However, the resilient sealing member 52, may be omitted depending on the use of the positioning device.

The datum block 9 is press fitted into the attaching bore 8 of the base plate 2. Two jacking bolts 54 are attached to the flange 9a of the block 9 in screw-thread engagement. And when removing the block 9 from the base plate 2, it is sufficient if the two bolts 54 are screwed downwards, thereby pushing their under surfaces to the stepped portion 8a of the attaching bore 8.

In this second embodiment, a compression coil spring 56 is attached instead of the coned disk springs 34 in FIG. 1A.

Figure 5:
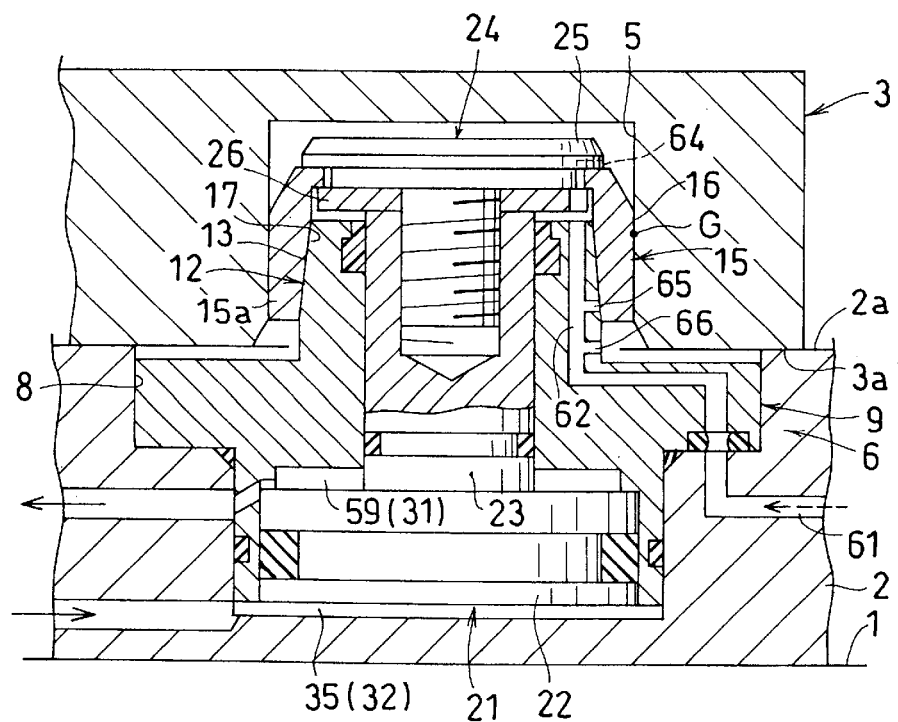
FIG. 5 shows a third embodiment of the present invention and is similar to FIG. 4A.

FIG. 5 shows a third embodiment and is similar to FIG. 4A.

In this case, the releasing means 32 has the releasing hydraulic chamber 35 and the locking means 31 has also a locking hydraulic chamber 59.

Additionally, there is provided a supply means which supplies cleaning compressed air. The supply means comprises a first flow passage 61 within the base plate 2 and a second flow passage 62 within the plug member 12. The second flow passage 62 communicates with discharge ports 64, 65 and 66. A first discharge port 64 is defined by a groove formed in an under surface of the head portion 25 of the pull bolt 24. A second discharge port 65 is opened to the slant outer surface 13 of the plug member 12. A third discharge port 66 is opened to an outer surface of a lower portion of the plug member 12.

The respective discharge ports 64, 65 and 66 may be inclined. Further, the flow passage of the compressed air may be formed from a clearance defined between an inner peripheral surface of the plug member 12 and an outer peripheral surface of the piston rod 23.

Besides, the discharge port for cleaning compressed air may be opened to at least one of the plug member 12, the intermediate member 15 and the pull bolt 24.

It is a matter of course that the cleaning means is applicable to the first embodiment and the second embodiment.

Figure 6:
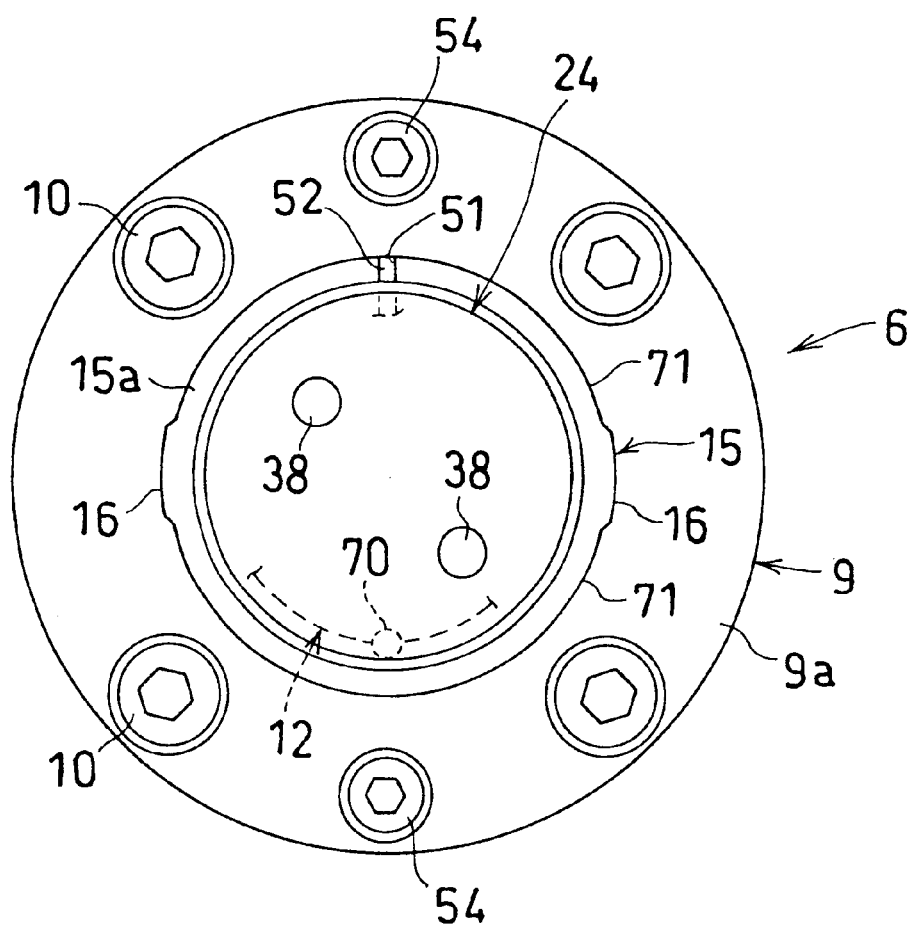
FIG. 6 shows a fourth embodiment of the present invention and is similar to FIG. 4B.

FIG. 6 shows a fourth embodiment and is similar to FIG. 4B.

In this case, the collet intermediate member 15 is attached to the plug member 12 through a pin 70 so that it is inhibited from rotating around an axis. The intermediate member 15 has the outer periphery provided partly with two straight outer surfaces 16, 16 so that they oppose to each other. Relief surfaces 71, 71 are formed by concaving portions defined between these paired straight outer surfaces 16, 16 (see two-dot chain line view in FIG. 4A).

And when using the positioning device of the type shown in FIG. 4B and the positioning device of the type shown in FIG. 6, owing to an action of the relief surfaces 71, 71, it is possible to smoothly fit the work pallet to the base plate and at the same time to position the former to the latter precisely.

Further, the embodiment shown in FIG. 5 (or FIG. 4A) may be changed to that of the following structure instead of the embodiment in FIG. 6.

The plug member 12 has the outer periphery provided with two projections for radial expansion (not shown) so that they oppose to one another and a recess is provided between these projections. Each of the projections is provided with the slant outer surface.

Besides, the projected portion which comprises the projection for radial expansion or the projected straight outer surface 16 in FIG. 6 may be provided in at least three as spaced apart from each other peripherally instead of in two. These projected portions are applicable not only to the device of FIG. 6 but also to the respective devices shown in FIGS. 1A and 1B, in FIGS. 4A and 4B, or in FIG. 5.

The respective embodiments can be further modified as follows.

The plug member 12 may be formed separately from the datum block 9 instead of integrally therewith. In this case, it is sufficient if the plug member 12 is rigidly fixed to the datum block 9 by bolt fastening, screw-thread engagement or the like.

The datum block 9 may be formed integrally with the base plate 2 instead of separately therefrom.

The pressurized fluid employed for locking or releasing may be compressed air and the like gas instead of the exemplified pressurized oil. Besides, the cleaning pressurized fluid may be nitrogen or the like gas and liquid instead of the exemplified compressed air.

The positioning device of the present invention may be provided with a means which confirms seating. For instance, the base plate 2 has the supporting surface 2a opened to provide a detecting nozzle hole (not shown). Detecting compressed air is supplied to the detecting nozzle hole. Then when the work pallet 3 has the supported surface 3a brought into contact with the supporting surface 2a, a pressure within the detecting nozzle hole increases. A pressure switch or the like senses the pressure increase, thereby being able to confirm the work pallet 3 has seated on the base plate 2.

The flow passage which confirms the seating may serve as the cleaning flow passage instead of being provided independently thereof.

The combination of the reference member with the movable member may be a combination of a table of a machine tool with a work pallet, a combination of a work pallet with a jig base, a combination of a jig base with a workpiece, and a combination of a working jig such as a welding jig with a work such as a workpiece instead of the exemplified combination of the base plate 2 with the work pallet 3. In addition, the present invention is applicable to positioning workpieces, tools or the like of various sorts of working machines such as a laser beam machine and an electric discharge machine.

It is a matter of course that the positioning device of the present invention can be used in only one set instead of in plural sets.

What is claimed is:

1. An automatic positioning device which receives a supported surface (3a) of a movable member (3) onto a supporting surface (2a) of a reference member (2), the device comprising:

a positioning hole (5) formed substantially circular and opened to the supported surface (3a) of the movable member (3);

a plug member (12) having an axis which extends in a direction to a leading end and in a direction to a base end and having a slant outer surface (13) which approaches the axis as it goes in the direction to the leading end, the plug member (12) projecting from the reference member (2) in the direction to the leading end and being fixed to the reference member (2);

an annular intermediate member (15) having a straight outer surface (16) which is fitted into the positioning hole (5) and a slant inner surface (17) which opposes to the slant outer surface (13), the intermediate member (15) being arranged outside the slant outer surface (13) and having at least one peripheral part constructed so that it radially expands and contracts;

a pull member (21) having a leading end portion and being axially movably inserted into the plug member (12), the leading end portion of the pull member (21) being connected to the intermediate member (15); and a locking means (31) and a releasing means (32) provided within the reference member (2), the locking means (31) moving the intermediate member (15) for locking in the direction to the base end through the pull member (21) and the releasing means (32) moving the intermediate member (15) for releasing in the direction to the leading end through the pull member (21).

2. The automatic positioning device as set forth in claim 1, wherein the intermediate member (15) has an annular wall (15a) and an inner periphery, and comprises a thin-walled cylinder, at least one part of the annular wall (15a) being constructed so that it elastically deforms radially outwards and returns radially inwards by its own elastic restoring force, the intermediate member (15) having the inner periphery provided with the slant inner surface (17) in plural number as spaced apart from each other peripherally.

3. The automatic positioning device as set forth in claim 2, wherein the slant outer surface (13) is provided in plural number as spaced apart from each other peripherally, and a rolling member (18) is inserted into a space defined between every slant outer surface (13) and every slant inner surface (17).

4. The automatic positioning device as set forth in claim 1, wherein the intermediate member (15) has an annular wall (15a) provided with at least one slit (51) axially extending, so that the annular wall (15a) elastically deforms radially outwards and returns radially inwards by its own elastic restoring force.

5. The automatic positioning device as set forth in claim 4, wherein rubber and the like resilient sealing member (52) is attached to the slit (51).

6. The automatic positioning device as set forth in claim 1, wherein the intermediate member (15) is formed over its substantially entire periphery with the straight outer surface (16).

7. The automatic positioning device as set forth in claim 1, wherein the intermediate member (15) is provided with the straight outer surface (16) in plural number as spaced apart from each other peripherally.

8. The automatic positioning device as set forth in claim 7, wherein the intermediate member (15) is attached to the plug member (12) so that it is inhibited from rotating around the axis and is provided with a pair of the straight outer surfaces (16, 16) which oppose to one another, relief surfaces (71, 71) being formed by concaving portions defined between the paired straight surfaces (16, 16).

9. The automatic positioning device as set forth in claim 1, wherein at least one of the plug member (12), the intermediate member (15) and the pull member (21) is opened to provide a discharge port (64, 65, 66) for discharging cleaning pressurized fluid.

10. The automatic positioning device as set forth in claim 1, wherein the slant inner surface (17) directly engages with the slant outer surface (13).

11. The automatic positioning device as set forth in claim 2, wherein the intermediate member (15) is formed over its substantially entire periphery with the straight outer surface (16).

12. The automatic positioning device as set forth in claim 2, wherein the intermediate member (15) is provided with the straight outer surface (16) in plural number as spaced apart from each other peripherally.

13. The automatic positioning device as set forth in claim 2, wherein the slant inner surface (17) directly engages with the slant outer surface (13).

14. The automatic positioning device as set forth in claim 3, wherein the intermediate member (15) is formed over its substantially entire periphery with the straight outer surface (16).

15. The automatic positioning device as set forth in claim 3, wherein the intermediate member (15) is provided with the straight outer surface (16) in plural number as spaced apart from each other peripherally.

16. The automatic positioning device as set forth in claim 4, wherein the slant inner surface (17) directly engages with the slant outer surface (13).

* * * * *

(12) EX PARTE REEXAMINATION CERTIFICATE (5916th)
United States Patent
Yonezawa

(10) Number: US 6,755,409 C1
(45) Certificate Issued: Oct. 2, 2007

(54) AUTOMATIC POSITIONING DEVICE

(75) Inventor: Keitaro Yonezawa, Kobe (JP)

(73) Assignee: Kabushiki Kaisha Kosmek, Kobe (JP)

Reexamination Request:
No. 90/007,443, Feb. 28, 2005

Reexamination Certificate for:
Patent No.: 6,755,409
Issued: Jun. 29, 2004
Appl. No.: 10/355,573
Filed: Jan. 31, 2003

(30) Foreign Application Priority Data
Feb. 22, 2002 (JP) .................... 2002-045519

(51) Int. Cl.
*B23Q 3/02* (2006.01)

(52) U.S. Cl. .................................. 269/309
(58) Field of Classification Search ....... 279/2.02–2.04, 279/2.11, 2.12, 2.22, 2.23; 269/20, 24, 27, 269/32, 25, 48.1, 93, 94, 50, 52, 91, 157, 269/309, 310
See application file for complete search history.

(56) References Cited

U.S. PATENT DOCUMENTS

| | | | | | |
|---|---|---|---|---|---|
| 1,235,957 A | * | 8/1917 | Bidwell | ................ | 279/2.23 |
| 2,293,085 A | * | 8/1942 | Steiber | ................ | 279/2.11 |
| 2,759,733 A | * | 8/1956 | Sloan | ................ | 279/2.03 |
| 2,890,056 A | * | 6/1959 | Parker et al. | ................ | 279/2.12 |
| 3,017,192 A | * | 1/1962 | Illowsek | ................ | 279/2.04 |
| 4,799,841 A | | 1/1989 | Ramsbro | | |
| 5,149,111 A | | 9/1992 | Han | | |
| 6,024,354 A | * | 2/2000 | Yonezawa | ................ | 269/309 |
| 6,105,951 A | | 8/2000 | Shibata | | |
| 2001/0030391 A1 | | 10/2001 | Barbieux | | |

FOREIGN PATENT DOCUMENTS

EP  0 310 967  4/1989
JP  59-232705 A  12/1984

OTHER PUBLICATIONS

Product Brochure, "7MPa Pascal hole clamp", Pascal Corporation, Pamphlet PA-144E, Rev. 1, (Oct. 2004), 7 pages.

* cited by examiner

*Primary Examiner*—Sara Clarke

(57) ABSTRACT

A work pallet (3) is opened to provide a circular positioning hole (5). A plug member (12) is inserted into the positioning hole (5) and projects from a base plate (2). The plug member (12) is provided with a slant outer surface (13) which narrows upwards. An intermediate member (15) in the shape of a thin-walled cylinder is arranged outside the plug member (12). The intermediate member (15) is provided with a straight outer surface (16) which is fitted into the positioning hole (5) and with a slant inner surface (17) which opposes to the slant outer surface (13) of the plug member (12). A coned disk spring (34) moves down the intermediate member (15) for locking through a pull member (21).

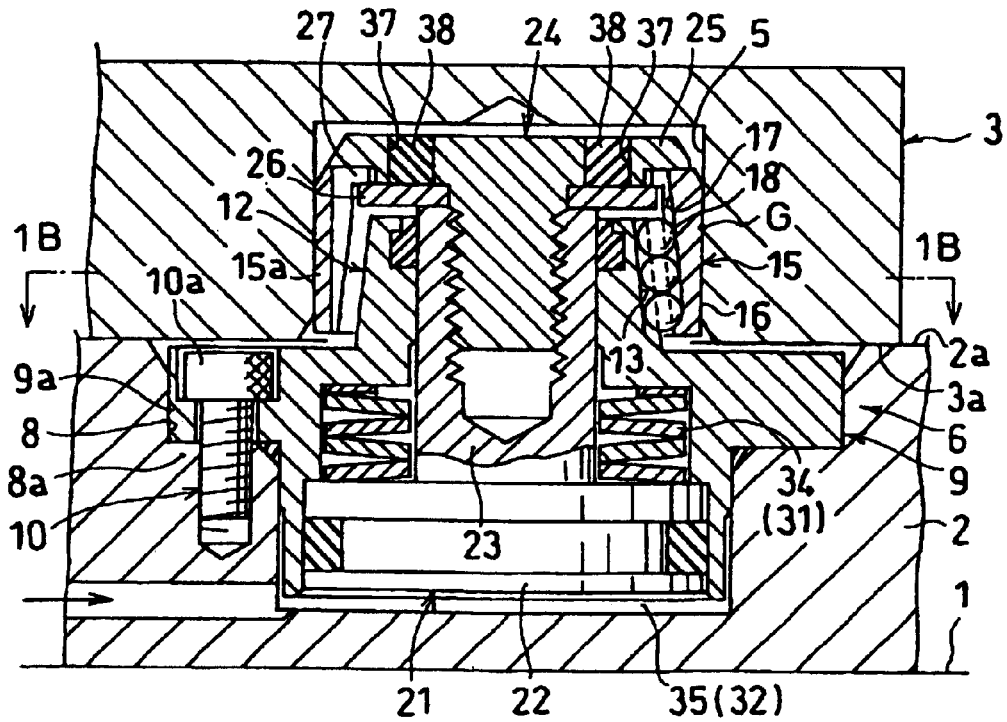

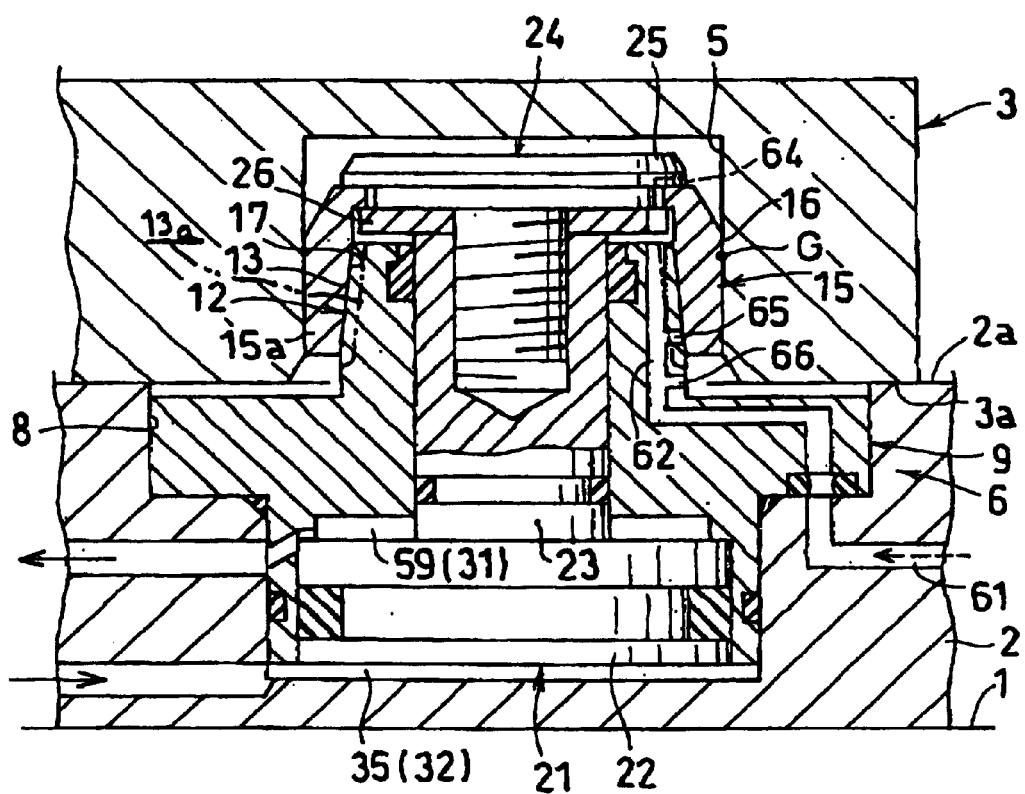
FIG. 5
(Amended)

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 8, lines 11–15:

The plug member 12 has the outer periphery provided with two projections for radial expansion [(not shown)] *13a* so that they oppose to one another and a recess is provided between these projections. Each of the projections is provided with the slant outer surface.

THE DRAWING FIGURES HAVE BEEN CHANGED AS FOLLOWS:

Reference numeral 13*a* has been added to FIG. 5.

AS A RESULT OF REEXAMINATION, IT HAS BEEN DETERMINED THAT:

Claims 7, 9 and 11–16 are cancelled.

Claims 1–3, 6, 8 and 10 are determined to be patentable as amended.

Claims 4 and 5, dependent on an amended claim, are determined to be patentable.

New claims 17–19 are added and determined to be patentable.

1. An automatic positioning device which receives a supported surface (3a) of a movable member (3) onto a supporting surface (2a) of a reference member (2), the device comprising:

a positioning hole (5) formed substantially circular and opened to the supported surface (3a) of the movable member (3);

a plug member (12) *provided with an outer periphery, having an axis which extends in a direction to a leading end and in a direction to a base end and having a slant outer surface (13) which approaches the axis as it goes in the direction to the leading end,* the plug member (12) projecting from the reference member (2) in the direction to the leading end and being fixed to the reference member (2);

an annular intermediate member (15) *provided with an outer periphery and an inner periphery, having a straight outer surface (16) which is fitted into the positioning hole (5) and a slant inner surface (17) which opposes to the slant outer surface (13),* the intermediate member (15) being arranged outside the slant outer surface (13) and having at least one peripheral part constructed so that it radially expands and contracts;

a pull member (21) having a leading end portion and being axially movably inserted into the plug member (12), the leading end portion of the pull member (21) being connected to the intermediate member (15); [and]

a locking means (31) and a releasing means (32) provided within the reference member (2), the locking means (31) moving the intermediate member (15) for locking in the direction to the base end through the pull member (21) and the releasing means (32) moving the intermediate member (15) for releasing in the direction to the leading end through the pull member (21)*; and*

*any one of the outer periphery of the intermediate member (15) and the inner periphery of the intermediate member (15) and the outer periphery of the plug member (12) is provided with two or three projections as spaced apart from each other peripherally, on the respective projections being formed the straight outer surface (16) or the slant inner surface (17) or the slant outer surface (13).*

2. The automatic positioning device as set forth in claim 1, wherein the intermediate member (15) has an annular wall (15a) and [an] *the* inner periphery, and comprises a thin-walled cylinder, at least one part of the annular wall (15a) being constructed so that it elastically deforms radially outwards and returns radially inwards by its own elastic restoring force, the intermediate member (15) having the inner periphery provided with the slant inner surface (17) in plural number as spaced apart from each other peripherally.

3. The automatic positioning device as set forth in claim [2] *6*, wherein [the slant outer surface (13) is provided in plural number as spaced apart from each other peripherally, and] a rolling member (18) is inserted into a space defined between [every] *the* slant outer surface (13) and [every] *the* slant inner surface (17).

6. The automatic positioning device as set forth in claim 1, wherein the intermediate member (15) is formed over its substantially entire periphery with the straight outer surface (16) *and any one of the inner periphery of the intermediate member (15) and the outer periphery of the plug member (12) is provided with the projections, on the respective projections being formed the slant inner surface (17) or the slant outer surface (13)*.

8. The automatic positioning device as set forth in claim [7] *17*, wherein the intermediate member (15) is attached to the plug member (12) so that it is inhibited from rotating around the axis [and is provided with a pair of the straight outer surfaces (16, 16) which oppose to one another, relief surfaces (71, 71) being formed by concaving portions defined between the paired straight surfaces (16, 16)].

10. The automatic positioning device as set forth in claim [1] *6*, wherein the slant inner surface (17) directly engages with the slant outer surface (13).

*17. The automatic positioning device as set forth in claim 1, wherein two projections are provided peripherally at substantially the same interval.*

*18. The automatic positioning device as set forth in claim 1, wherein the intermediate member (15) having the outer periphery is provided with two projections peripherally at substantially the same interval, said two projections which oppose to one another are provided with a pair of the straight outer surfaces (16, 16), relief surfaces (71, 71) being formed by concaving portions defined between the paired straight surfaces (16, 16).*

*19. The automatic positioning device as set forth in claim 18, wherein the intermediate member (15) is attached to the plug member (12) so that it is inhibited from rotating around the axis.*

* * * * *